(12) United States Patent
Morgan et al.

(10) Patent No.: US 9,665,997 B2
(45) Date of Patent: May 30, 2017

(54) METHOD AND SYSTEM FOR PROVIDING FEEDBACK BASED ON DRIVING BEHAVIOR

(71) Applicant: **Gordon*Howard Associates, Inc.**, Littleton, CO (US)

(72) Inventors: Gerald A. Morgan, Littleton, CO (US); Christopher M. Macheca, Centennial, CO (US)

(73) Assignee: **Gordon*Howard Associates, Inc.**, Littleton, CO (US)

( * ) Notice: Subject to any disclaimer, the term of this patent is extended or adjusted under 35 U.S.C. 154(b) by 6 days.

(21) Appl. No.: 13/736,468

(22) Filed: Jan. 8, 2013

(65) Prior Publication Data

US 2014/0191858 A1 Jul. 10, 2014

(51) Int. Cl.
- *B60Q 1/00* (2006.01)
- *G07C 5/08* (2006.01)
- *G09B 9/052* (2006.01)

(52) U.S. Cl.
CPC ......... *G07C 5/0816* (2013.01); *G07C 5/0841* (2013.01); *G09B 9/052* (2013.01)

(58) Field of Classification Search
CPC .. G07C 5/008; G07C 5/0808; G07C 9/00309; G07C 9/00182; C07C 5/085; B60N 2002/0272; B60R 2021/23153
USPC ........... 340/439, 575, 576, 425.5, 435, 5.61, 340/5.64, 5.72, 438; 701/1, 4, 51, 35, 701/465, 31.4, 32.7, 32.4; 705/36 R
See application file for complete search history.

(56) References Cited

U.S. PATENT DOCUMENTS

| | | | |
|---|---|---|---|
| 4,335,370 A | 6/1982 | Scalley et al. | |
| 4,592,443 A | 6/1986 | Simon | |
| 4,624,578 A | 11/1986 | Green | |
| 4,688,026 A | 8/1987 | Scribner et al. | |
| 4,700,296 A | 10/1987 | Palmer, Jr. et al. | |
| 4,736,294 A | 4/1988 | Gill et al. | |
| 4,738,333 A | 4/1988 | Collier et al. | |
| 4,800,590 A | 1/1989 | Vaughan | |
| 5,014,206 A | 5/1991 | Scribner et al. | |
| 5,132,968 A | 7/1992 | Cephus | |
| 5,228,083 A | 7/1993 | Lozowick et al. | |
| 5,359,528 A * | 10/1994 | Haendel | G07C 5/085 340/438 |

(Continued)

FOREIGN PATENT DOCUMENTS

| | | |
|---|---|---|
| EP | 1557807 | 7/2005 |
| KR | 10-2004-0073816 | 8/2004 |

(Continued)

OTHER PUBLICATIONS

US 5,699,633, 10/1999, Roser (withdrawn)

(Continued)

*Primary Examiner* — Hoi Lau
(74) *Attorney, Agent, or Firm* — Conley Rose, PC

(57) ABSTRACT

Providing feedback based on driving behavior. At least some of the illustrative embodiments are methods including: determining an indication of driving behavior of a driver, the determining by: identifying the driver in a vehicle; detecting movement of the vehicle; collecting data related to the driving behavior of the driver; and issuing an alert related to the driving behavior of the driver for the purpose of providing feedback related to the driving behavior.

22 Claims, 5 Drawing Sheets

(56) References Cited

U.S. PATENT DOCUMENTS

| | | | | |
|---|---|---|---|---|
| 5,426,415 | A | 6/1995 | Prachar et al. | |
| 5,490,200 | A | 2/1996 | Snyder et al. | |
| 5,495,531 | A | 2/1996 | Smiedt | |
| 5,510,780 | A | 4/1996 | Norris et al. | |
| 5,619,573 | A | 4/1997 | Brinkmeyer et al. | |
| 5,673,318 | A | 9/1997 | Bellare et al. | |
| 5,708,712 | A | 1/1998 | Brinkmeyer et al. | |
| 5,775,290 | A | 7/1998 | Staerzi et al. | |
| 5,797,134 | A | 8/1998 | McMillan et al. | |
| 5,818,725 | A | 10/1998 | McNamara et al. | |
| 5,819,869 | A | 10/1998 | Horton | |
| 5,857,024 | A * | 1/1999 | Nishino | G06F 21/34 235/380 |
| 5,898,391 | A | 4/1999 | Jefferies et al. | |
| 5,917,405 | A | 6/1999 | Joao | |
| 5,928,291 | A * | 7/1999 | Jenkins | G06Q 99/00 701/1 |
| 5,940,812 | A | 8/1999 | Tengel et al. | |
| 5,969,633 | A | 10/1999 | Rosler | |
| 5,970,143 | A | 10/1999 | Schneier et al. | |
| 5,970,481 | A * | 10/1999 | Westerlage | G01C 21/26 705/31 |
| 6,025,774 | A | 2/2000 | Forbes | |
| 6,026,922 | A | 2/2000 | Horton | |
| 6,032,258 | A | 2/2000 | Godoroja et al. | |
| 6,064,970 | A | 5/2000 | McMillan et al. | |
| 6,088,143 | A | 7/2000 | Bang | |
| 6,130,621 | A | 10/2000 | Weiss | |
| 6,157,317 | A | 12/2000 | Walker | |
| 6,185,307 | B1 | 2/2001 | Johnson, Jr. | |
| 6,195,648 | B1 | 2/2001 | Simon et al. | |
| 6,225,890 | B1 | 5/2001 | Murphy | |
| 6,232,874 | B1 | 5/2001 | Murphy | |
| 6,233,566 | B1 | 5/2001 | Levine et al. | |
| 6,249,217 | B1 | 6/2001 | Forbes | |
| 6,249,227 | B1 | 6/2001 | Brady et al. | |
| 6,278,936 | B1 | 8/2001 | Jones | |
| 6,353,776 | B1 | 3/2002 | Rohrl et al. | |
| 6,370,649 | B1 | 4/2002 | Angelo et al. | |
| 6,380,848 | B1 | 4/2002 | Weigl et al. | |
| 6,401,204 | B1 | 6/2002 | Euchner et al. | |
| 6,429,773 | B1 | 8/2002 | Schuyler | |
| 6,489,897 | B2 | 12/2002 | Simon | |
| 6,587,739 | B1 | 7/2003 | Abrams et al. | |
| 6,601,175 | B1 | 7/2003 | Arnold et al. | |
| 6,611,201 | B1 | 8/2003 | Bishop et al. | |
| 6,611,686 | B1 | 8/2003 | Smith et al. | |
| 6,615,186 | B1 | 9/2003 | Kolls | |
| 6,665,613 | B2 | 12/2003 | Duvall | |
| 6,693,517 | B2 * | 2/2004 | McCarthy et al. | 340/425.5 |
| 6,714,859 | B2 | 3/2004 | Jones | |
| 6,717,527 | B2 | 4/2004 | Simon | |
| 6,741,927 | B2 | 5/2004 | Jones | |
| 6,804,606 | B2 | 10/2004 | Jones | |
| 6,812,829 | B1 | 11/2004 | Flick | |
| 6,816,089 | B2 | 11/2004 | Flick | |
| 6,816,090 | B2 | 11/2004 | Teckchandani et al. | |
| 6,828,692 | B2 | 12/2004 | Simon | |
| 6,868,386 | B1 | 3/2005 | Henderson et al. | |
| 6,870,467 | B2 | 3/2005 | Simon | |
| 6,873,824 | B2 | 3/2005 | Flick | |
| 6,888,495 | B2 | 5/2005 | Flick | |
| 6,917,853 | B2 | 7/2005 | Chirnomas | |
| 6,924,750 | B2 | 8/2005 | Flick | |
| 6,950,807 | B2 | 9/2005 | Brock | |
| 6,952,645 | B1 | 10/2005 | Jones | |
| 6,961,001 | B1 | 11/2005 | Chang et al. | |
| 6,972,667 | B2 | 12/2005 | Flick | |
| 6,985,583 | B1 | 1/2006 | Brainard et al. | |
| 6,993,658 | B1 | 1/2006 | Engberg et al. | |
| 7,005,960 | B2 | 2/2006 | Flick | |
| 7,015,830 | B2 | 3/2006 | Flick | |
| 7,020,798 | B2 | 3/2006 | Meng et al. | |
| 7,031,826 | B2 | 4/2006 | Flick | |
| 7,031,835 | B2 | 4/2006 | Flick | |
| 7,039,811 | B2 | 5/2006 | Ito | |
| 7,053,823 | B2 | 5/2006 | Cervinka et al. | |
| 7,061,137 | B2 | 6/2006 | Flick | |
| 7,091,822 | B2 | 8/2006 | Flick et al. | |
| 7,103,368 | B2 | 9/2006 | Teshima | |
| 7,123,128 | B2 | 10/2006 | Mullet et al. | |
| 7,124,088 | B2 | 10/2006 | Bauer et al. | |
| 7,133,685 | B2 | 11/2006 | Hose et al. | |
| 7,142,089 | B2 * | 11/2006 | Yamagishi | 340/5.52 |
| 7,149,623 | B2 | 12/2006 | Flick | |
| 7,205,679 | B2 | 4/2007 | Flick | |
| 7,224,083 | B2 | 5/2007 | Flick | |
| 7,228,417 | B2 * | 6/2007 | Roskind | G06F 21/31 380/255 |
| 7,266,507 | B2 | 9/2007 | Simon et al. | |
| 7,292,152 | B2 * | 11/2007 | Torkkola et al. | 340/576 |
| 7,299,890 | B2 | 11/2007 | Mobley | |
| 7,310,618 | B2 | 12/2007 | Libman | |
| 7,323,982 | B2 | 1/2008 | Staton et al. | |
| 7,327,250 | B2 | 2/2008 | Harvey | |
| 7,379,805 | B2 | 5/2008 | Olsen, III et al. | |
| 7,389,916 | B2 | 6/2008 | Chirnomas | |
| 7,427,924 | B2 | 9/2008 | Ferrone et al. | |
| 7,542,921 | B1 | 6/2009 | Hildreth | |
| 7,561,102 | B2 | 7/2009 | Duvall | |
| 7,814,005 | B2 | 10/2010 | Imrey et al. | |
| 7,818,254 | B1 | 10/2010 | Ma | |
| 7,823,681 | B2 | 11/2010 | Crespo et al. | |
| 7,873,455 | B2 | 1/2011 | Arshad et al. | |
| 7,877,269 | B2 | 1/2011 | Bauer et al. | |
| 7,904,332 | B1 | 3/2011 | Merkley | |
| 7,930,211 | B2 | 4/2011 | Crolley | |
| 8,018,329 | B2 | 9/2011 | Morgan et al. | |
| 8,086,523 | B1 | 12/2011 | Palmer | |
| 8,095,394 | B2 | 1/2012 | Nowak et al. | |
| 8,140,358 | B1 | 3/2012 | Ling et al. | |
| 8,217,772 | B2 | 7/2012 | Morgan et al. | |
| 8,325,025 | B2 | 12/2012 | Morgan et al. | |
| 8,344,894 | B2 * | 1/2013 | Szczerba et al. | 340/576 |
| 8,370,027 | B2 | 2/2013 | Pettersson et al. | |
| 8,370,925 | B2 | 2/2013 | Childress et al. | |
| 8,510,556 | B2 | 8/2013 | Cao et al. | |
| 8,630,768 | B2 * | 1/2014 | McClellan et al. | 701/36 |
| 8,653,956 | B2 | 2/2014 | Berkobin et al. | |
| 8,754,751 | B1 | 6/2014 | Piccoli | |
| 8,841,987 | B1 * | 9/2014 | Stanfield et al. | 340/5.61 |
| 9,002,536 | B2 * | 4/2015 | Hatton | 701/2 |
| 9,053,516 | B2 * | 6/2015 | Stempora | G06Q 40/08 |
| 2001/0034577 | A1 * | 10/2001 | Grounds | G01S 5/0027 701/521 |
| 2001/0040503 | A1 | 11/2001 | Bishop | |
| 2002/0019055 | A1 | 2/2002 | Brown | |
| 2002/0091473 | A1 * | 7/2002 | Gardner | G07C 5/0808 701/32.7 |
| 2002/0099596 | A1 * | 7/2002 | Geraghty | G06Q 30/0202 705/7.31 |
| 2002/0120371 | A1 * | 8/2002 | Leivian et al. | 701/1 |
| 2002/0120374 | A1 * | 8/2002 | Douros et al. | 701/29 |
| 2002/0193926 | A1 | 12/2002 | Katagishi et al. | |
| 2003/0036823 | A1 | 2/2003 | Mahvi | |
| 2003/0095046 | A1 * | 5/2003 | Borugian | 340/576 |
| 2003/0101120 | A1 * | 5/2003 | Tilton | 705/36 |
| 2003/0151501 | A1 | 8/2003 | Teckchandani et al. | |
| 2003/0191583 | A1 | 10/2003 | Uhlmann et al. | |
| 2003/0231550 | A1 * | 12/2003 | Macfarlane | 367/198 |
| 2004/0088345 | A1 | 5/2004 | Zellner et al. | |
| 2004/0153362 | A1 | 8/2004 | Bauer et al. | |
| 2004/0176978 | A1 | 9/2004 | Simon et al. | |
| 2004/0177034 | A1 | 9/2004 | Simon et al. | |
| 2004/0203974 | A1 | 10/2004 | Seibel et al. | |
| 2004/0204795 | A1 | 10/2004 | Harvey et al. | |
| 2004/0239510 | A1 | 12/2004 | Karsten | |
| 2004/0252027 | A1 * | 12/2004 | Torkkola et al. | 340/576 |
| 2005/0017855 | A1 | 1/2005 | Harvey | |
| 2005/0024203 | A1 | 2/2005 | Wolfe | |
| 2005/0030184 | A1 * | 2/2005 | Victor | 340/576 |
| 2005/0033483 | A1 | 2/2005 | Simon et al. | |
| 2005/0128080 | A1 | 6/2005 | Hall et al. | |
| 2005/0134438 | A1 | 6/2005 | Simon | |

(56) References Cited

U.S. PATENT DOCUMENTS

| | | |
|---|---|---|
| 2005/0162016 A1 | 7/2005 | Simon |
| 2005/0200453 A1 | 9/2005 | Turner et al. |
| 2005/0231323 A1* | 10/2005 | Underdahl ............. B60R 25/00 340/5.72 |
| 2005/0270178 A1 | 12/2005 | Ioli |
| 2006/0028431 A1 | 2/2006 | Leong |
| 2006/0059109 A1 | 3/2006 | Grimes |
| 2006/0080599 A1 | 4/2006 | Dubinsky |
| 2006/0100944 A1 | 5/2006 | Reddin et al. |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0021100 A1 | 1/2007 | Haave et al. |
| 2007/0038351 A1 | 2/2007 | Larschan et al. |
| 2007/0082614 A1 | 4/2007 | Mock |
| 2007/0139189 A1 | 6/2007 | Helmig |
| 2007/0146146 A1* | 6/2007 | Kopf et al. ................... 340/575 |
| 2007/0176771 A1 | 8/2007 | Doyle |
| 2007/0179692 A1 | 8/2007 | Smith et al. |
| 2007/0185728 A1 | 8/2007 | Schwarz et al. |
| 2007/0194881 A1 | 8/2007 | Schwarz et al. |
| 2007/0222588 A1 | 9/2007 | Wolfe |
| 2007/0224939 A1 | 9/2007 | Jung et al. |
| 2007/0285207 A1 | 12/2007 | Bates |
| 2007/0288271 A1* | 12/2007 | Klinkhammer ........ G06Q 40/02 705/4 |
| 2007/0299567 A1 | 12/2007 | Simon et al. |
| 2008/0042814 A1* | 2/2008 | Hurwitz et al. .............. 340/435 |
| 2008/0109378 A1 | 5/2008 | Papadimitriou |
| 2008/0114541 A1 | 5/2008 | Shintani et al. |
| 2008/0150683 A1 | 6/2008 | Mikan et al. |
| 2008/0162034 A1 | 7/2008 | Breen |
| 2008/0221743 A1 | 9/2008 | Schwarz et al. |
| 2008/0223646 A1 | 9/2008 | White |
| 2008/0231446 A1 | 9/2008 | Cresto |
| 2008/0243558 A1* | 10/2008 | Gupte ............................. 705/4 |
| 2008/0245598 A1 | 10/2008 | Gratz et al. |
| 2008/0255722 A1* | 10/2008 | McClellan ............ B60R 25/102 701/31.4 |
| 2008/0294302 A1 | 11/2008 | Basir |
| 2008/0301038 A1* | 12/2008 | Anderson ............. G06Q 40/02 705/38 |
| 2009/0043409 A1 | 2/2009 | Ota |
| 2009/0051510 A1* | 2/2009 | Follmer et al. ............. 340/425.5 |
| 2009/0182216 A1 | 7/2009 | Roushey, III et al. |
| 2009/0234770 A1 | 9/2009 | Simon |
| 2009/0237249 A1 | 9/2009 | Bielas |
| 2009/0248222 A1* | 10/2009 | McGarry et al. ................. 701/2 |
| 2009/0284359 A1 | 11/2009 | Huang et al. |
| 2009/0284367 A1 | 11/2009 | Pfafman et al. |
| 2009/0295537 A1 | 12/2009 | Lane et al. |
| 2010/0030586 A1 | 2/2010 | Taylor et al. |
| 2010/0045452 A1* | 2/2010 | Periwal ........................... 340/439 |
| 2010/0063850 A1 | 3/2010 | Daniel |
| 2010/0075655 A1 | 3/2010 | Howarter et al. |
| 2010/0090826 A1 | 4/2010 | Moran et al. |
| 2010/0131303 A1* | 5/2010 | Collopy ............. G06Q 30/0224 705/4 |
| 2010/0148947 A1 | 6/2010 | Morgan et al. |
| 2010/0238009 A1* | 9/2010 | Cook et al. ..................... 340/439 |
| 2010/0268402 A1 | 10/2010 | Schwarz et al. |
| 2010/0312691 A1 | 12/2010 | Johnson, Jr. |
| 2011/0040630 A1 | 2/2011 | Weiss |
| 2011/0050407 A1 | 3/2011 | Schoenfeld et al. |
| 2011/0057800 A1 | 3/2011 | Sofer |
| 2011/0084820 A1 | 4/2011 | Walter et al. |
| 2011/0148626 A1 | 6/2011 | Acevedo |
| 2011/0153143 A1 | 6/2011 | O'Neil et al. |
| 2011/0210867 A1 | 9/2011 | Benedikt |
| 2011/0270779 A1* | 11/2011 | Showalter ..................... 705/36 R |
| 2012/0066011 A1 | 3/2012 | Ichien et al. |
| 2012/0068858 A1* | 3/2012 | Fredkin ........................... 340/902 |
| 2012/0068886 A1 | 3/2012 | Torres |
| 2012/0089423 A1* | 4/2012 | Tamir et al. ..................... 705/4 |
| 2012/0098678 A1* | 4/2012 | Rathmacher ....... G01C 21/3697 340/937 |
| 2012/0158356 A1 | 6/2012 | Prochaska et al. |
| 2012/0203441 A1 | 8/2012 | Higgins et al. |
| 2012/0212353 A1* | 8/2012 | Fung et al. ..................... 340/905 |
| 2012/0221216 A1* | 8/2012 | Chauncey et al. .............. 701/51 |
| 2013/0018677 A1* | 1/2013 | Chevrette ........................ 705/4 |
| 2013/0074107 A1 | 3/2013 | Hyde et al. |
| 2013/0074111 A1 | 3/2013 | Hyde et al. |
| 2013/0074112 A1 | 3/2013 | Hyde et al. |
| 2013/0074115 A1 | 3/2013 | Hyde et al. |
| 2013/0099892 A1* | 4/2013 | Tucker et al. ................. 340/5.61 |
| 2013/0127617 A1 | 5/2013 | Baade et al. |
| 2013/0138460 A1* | 5/2013 | Schumann et al. ............... 705/4 |
| 2013/0141252 A1 | 6/2013 | Ricci |
| 2013/0144460 A1 | 6/2013 | Ricci |
| 2013/0144461 A1* | 6/2013 | Ricci ................................ 701/1 |
| 2013/0144469 A1 | 6/2013 | Ricci |
| 2013/0144770 A1* | 6/2013 | Boling et al. ................... 705/35 |
| 2013/0144771 A1* | 6/2013 | Boling et al. ................... 705/35 |
| 2013/0144805 A1* | 6/2013 | Boling ................... G06Q 40/06 705/36 R |
| 2013/0204455 A1* | 8/2013 | Chia ...................... G07C 5/008 701/1 |
| 2013/0338914 A1* | 12/2013 | Weiss ................. G08G 1/09626 701/465 |
| 2014/0191858 A1* | 7/2014 | Morgan ............... G07C 5/0816 340/439 |
| 2014/0225724 A1* | 8/2014 | Rankin et al. ................. 340/438 |
| 2014/0358896 A1* | 12/2014 | Camacho et al. ............. 707/722 |
| 2016/0090923 A1 | 3/2016 | Al Salah |
| 2016/0371788 A1* | 12/2016 | Rackley, III ........ G06Q 30/0645 |

FOREIGN PATENT DOCUMENTS

| | | |
|---|---|---|
| KR | 1020040073816 | 8/2004 |
| WO | 9616845 | 6/1996 |
| WO | 2007092272 | 8/2007 |
| WO | 2007092287 | 8/2007 |
| WO | 2010/068438 A2 | 6/2010 |
| WO | 2010062899 | 6/2010 |
| WO | 2012/097441 A1 | 7/2012 |
| WO | 2012097441 | 7/2012 |

OTHER PUBLICATIONS

Schwarz et al. Office Action dated Aug. 21, 2009; U.S. Appl. No. 11/349,523, filed Feb. 7, 2006, p. 18.

Schwarz et al., Response to Office Action dated Aug. 21, 2009; filed Jan. 21, 2010; U.S. Appl. No. 11/349,523, filed Feb. 7, 2006, 36 p.

Schwarz et al., Final Office Action dated May 4, 2010; U.S. Appl. No. 11/349,523, filed Feb. 7, 2006, 19 p.

Schwarz et al., RCE and Response to Final Office Action dated May 4, 2010, filed Jul. 12, 2010; U.S. Appl. No. 11/349,523, filed Feb. 7, 2006, 40 p.

Schwarz et al., Office Action dated Oct. 26, 2010; U.S. Appl. No. 11/349,523, filed Feb. 7, 2006, 16 p.

Schwarz et al., Response to Office Action dated Oct. 26, 2010, filed Feb. 21, 2011; U.S. Appl. No. 11/349,523, filed Feb. 7, 2006, 27 p.

Schwarz et al., Final Office Action dated Apr. 28, 2011; U.S. Appl. No. 11/349,523, filed Feb. 7, 2006, 17 p.

Schwarz et al., Preliminary Amendment filed Mar. 16, 2007; U.S. Appl. No. 11/539,292, filed Oct. 6, 2006, 28 p.

Schwarz et al., Office Action dated Jul. 22, 2009; U.S. Appl. No. 11/539,292, filed Oct. 6, 2006, 22 p.

Schwarz et al., Office Action dated May 14, 2010; U.S. Appl. No. 11/539,292, filed Oct. 6, 2006, 13 p.

Schwarz et al., Response to Office Action dated May 14, 2010, filed Jul. 12, 2010; U.S. Appl. No. 11/539,292, filed Oct. 6, 2006, 50 p.

Schwarz et al., Office Action dated Oct. 15, 2010; U.S. Appl. No. 11/539,292, filed Oct. 6, 2006, 13 p.

Schwarz et al., Response to Office Action dated Oct. 15, 2010 filed Feb. 15, 2011; U.S. Appl. No. 11/539,292, filed Oct. 6, 2006, 36 p.

(56) References Cited

OTHER PUBLICATIONS

Schwarz et al., Final Office Action dated May 26, 2011; U.S. Appl. No. 11/539,292, filed Oct. 6, 2006, 16 p.
Gordon*Howard Associates, Inc., International Search Report and Written Opinion of the International Searching Authority dated Nov. 29, 2007 in PCT Patent Application No. PCT/US07/02816, 6 p.
Gordon*Howard Associates, Inc., International Search Report and Written Opinion of the International Searching Authority dated Dec. 4, 2007 in PCT Patent Application No. PCT/US07/02840, 6 p.
On Time Payment Protection Systems, printed Jan. 2, 2004 from www.ontime-pps.com/how.html.
Aircept Products, printed Jan. 2, 2004 from www.aircept.com/products.html.
How PayTeck Works, printed Jan. 2, 2004 from www.payteck.cc/aboutpayteck.html.
Article: "Pager Lets You Locate Your Car, Unlock and Start It", published Dec. 10, 1997 in USA Today.
Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published, May 18, 1998.
Secure Your Credit & Secure Your Investment (Pay Teck advertisement), printed Jan. 2, 2004 from www.payteck.cc.
iMetrik Company Information, printed Dec. 21, 2006 from imetrik.com.
About C-CHIP Technologies, printed Dec. 21, 2006 from www.c-chip.com.
HI-Tech tools to solve traditional problems, printed Dec. 21, 2006 from www.c-chip.com.
C-CHIP Technologies Products: Credit Chip 100, Credit Chip 100C, Credit Chip 200, printed Dec. 21, 2006 from www.c-chip.com.
The Credit Chip 100, printed Dec. 21, 2006 from www.c-chip.com.
PCT Search Report and Written Opinion, Application No. PCT/2014/010282, mailed May 8, 2014 (11 pages).
EEC-EN0F204RK Panasonic Electronic Components | P14164CT-ND | DigiKey. Web. Accessed Feb. 13, 2013. www.digikey.com/product-detail/en/EEC-EN0F204RK/P14164CT-ND/1937322.
Fogerson, R. et al. "Qualitative Detection of Opiates in Sweat by EIA and GC-MS". Journal of Analytical Toxicology. Oct. 6, 1997, vol. 21, No. 6, pp. 451-458(8) (Abstract).
De La Torre, R. et al. "Usefulness of Sweat Testing for the Detection of Cannabis Smoke." 2004 American Association for Clinical Chemistry, Inc. 29th Arnold O. Beckman Conference. Apr. 12-13, 2011. San Diego, CA.

\* cited by examiner

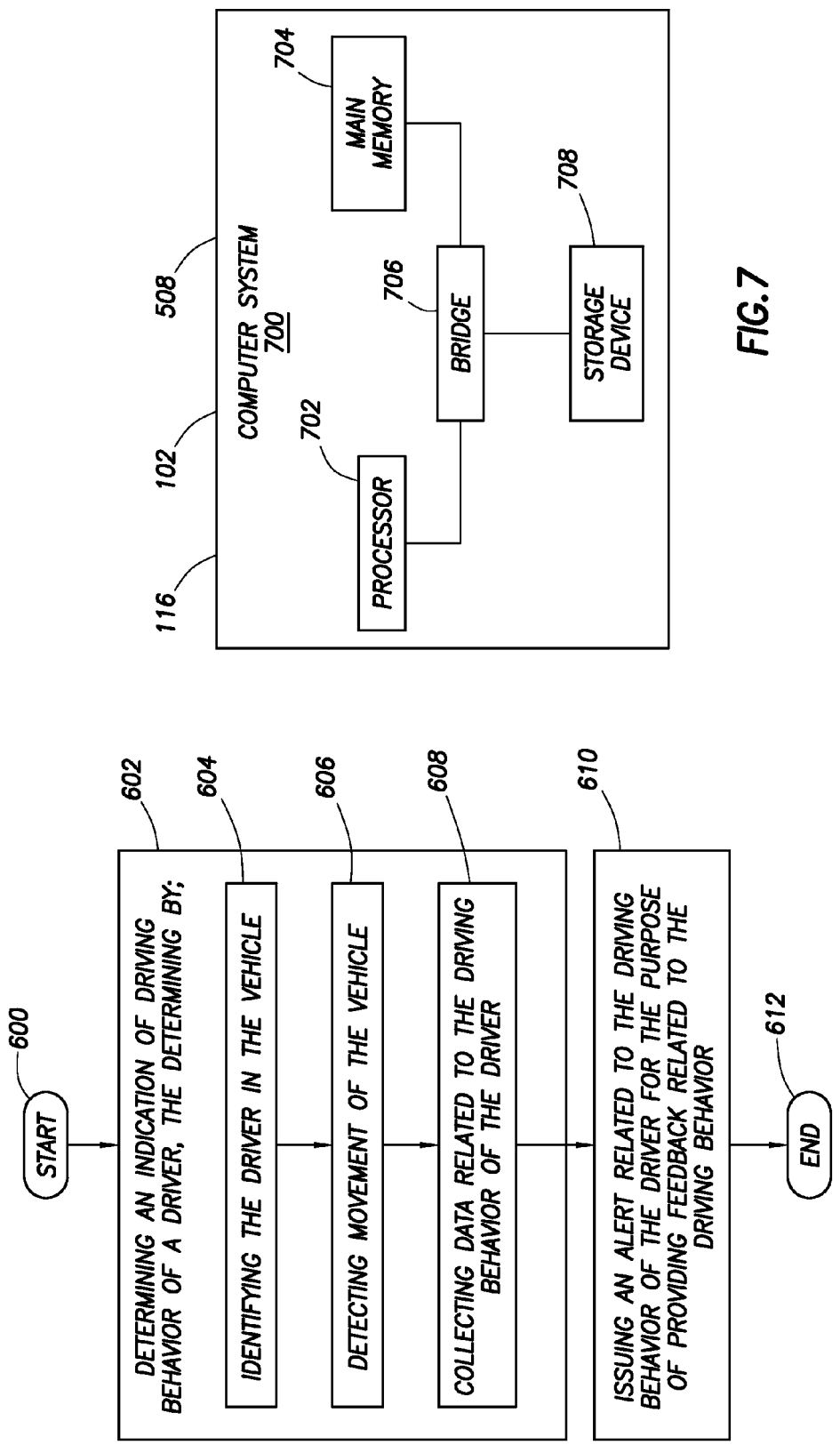

METHOD AND SYSTEM FOR PROVIDING FEEDBACK BASED ON DRIVING BEHAVIOR

BACKGROUND

Drivers, including new drivers, may not be aware of their driving habits and behaviors unless they have a passenger with them in the vehicle. Even in that instance, a driver may not be aware of whether his driving behaviors are rare or common, and whether they relate to an inefficient operation of the vehicle or whether they indicate unsafe or safe operation of the vehicle. Thus, any advancement that allows a driver to receive feedback related to his driving may be beneficial in improving driving related behaviors and habits.

BRIEF DESCRIPTION OF THE DRAWINGS

For a detailed description of exemplary embodiments, reference will now be made to the accompanying drawings in which:

FIG. 6 shows, in block diagram form, a method in accordance with at least some embodiments; and FIG. 7 shows, in block diagram form, a computer system in accordance with at least some embodiments.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Remote" shall mean one kilometer or more.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to issuing an alert to a driver or a third party related to the driving behavior of a driver in a vehicle. In particular, a driver is first identified as the driver for whom the driving behaviors will be monitored. Then, data related to the driver's operation of the vehicle is collected, and at least one alert may be issued based on the driving behavior of the driver. The alert may be issued in real-time in accordance with specific driving situations, or the alert may be sent at the end of a predetermined time period and may indicate an aggregation of driving behavior indications over the predetermined time period.

Figure 1:
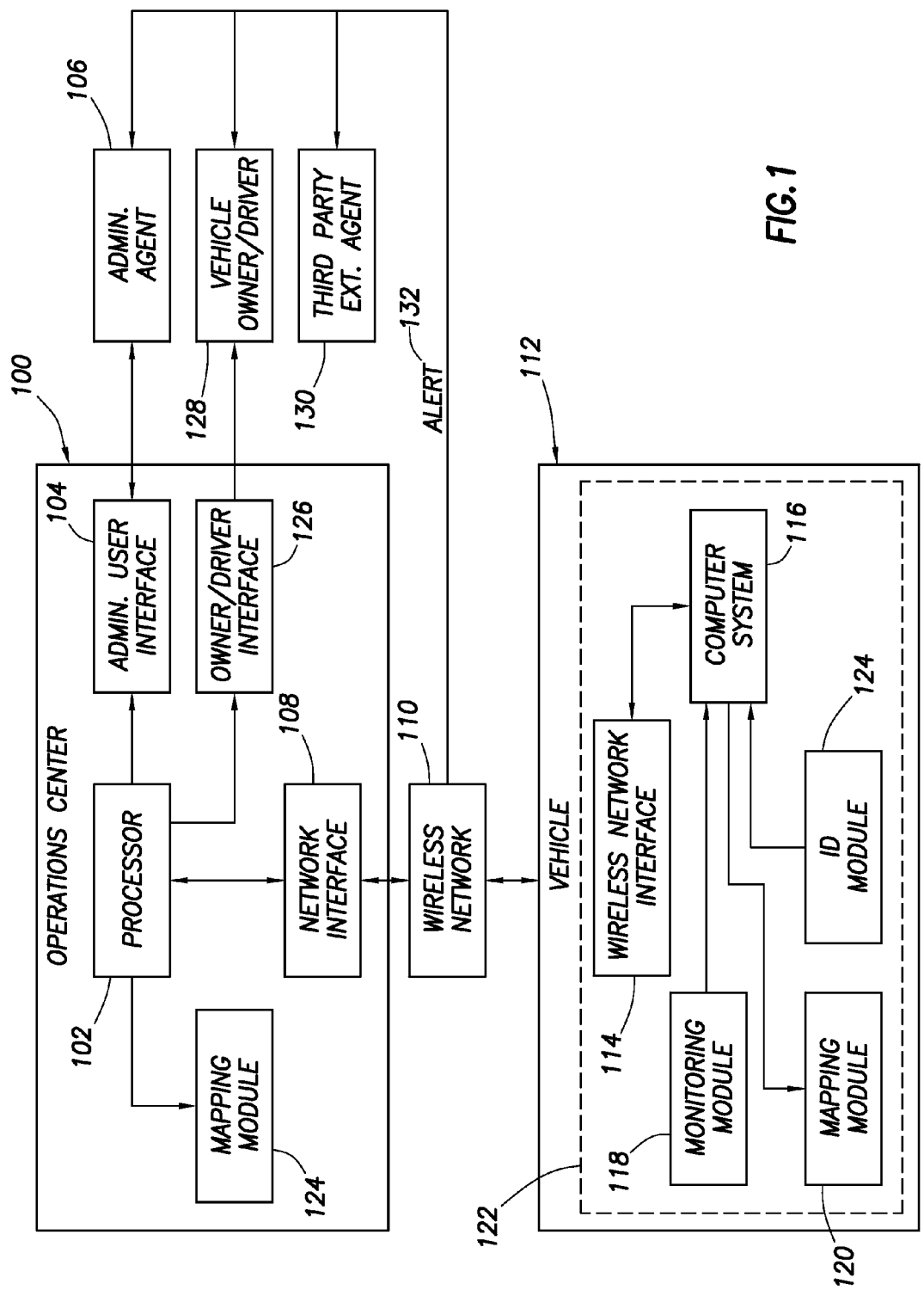
FIG. 1 shows, in block diagram form, a system in accordance with at least some embodiments.

FIG. 1 shows, in block diagram form, a system in accordance with at least some embodiments. In particular, the system comprises an operations center 100 communicatively coupled to a vehicle 112 by way of a wireless network 110. The operations center 100 comprises a processor 102. In some embodiments, the processor 102 may be a stand-alone computer system, or the processor may comprise a plurality of computer systems communicatively coupled and performing the functions of the operations center, the functions discussed more thoroughly below. The processor 102 may couple to an administrative user interface 104. The administrative user interface may enable an administrative agent 106 to control or configure the operation of the system. The processor 102 may also couple to an owner/driver interface 126. The owner/driver interface may enable the owner 128 of the vehicle 112 to control or configure the operation of the system. In another embodiment, owner 128 may be the driver of the vehicle as well. In yet another embodiment, the driver 128 may not be the vehicle owner, but may also control or configure the operation of the system.

The operations center 100 may further comprise a mapping module 120 coupled to the processor 102. In accordance with at least some embodiments, the mapping module 120 is a stand-alone computer system executing software to perform a mapping function associated with the location of the vehicle 112. In yet still other embodiments, the mapping module 120 may be a computer program or program package that operates or executes on the processor 102.

In order to communicate with the vehicle 112, the operations center 100 may further comprise a network interface 108 communicatively coupled to the processor 102. By way of the network interface 108, the processor 102, and any programs executing thereon, may communicate with vehicle 112, such as by wireless network 110. Wireless network 110 is illustrative of any suitable communications network, such as a cellular network, a pager network, or other mechanism for transmitting information between the operations center 100 and the vehicle 112.

In accordance with at least some embodiments, the operations center 100 is remotely located from the vehicle 112. In some cases, the operations center 100 and vehicle 112 may be located within the same city or state. In other cases, the operations center 100 may be many hundreds or thousands of miles from vehicle 112, and thus the illustrative wireless network 110 may span several types of communication networks.

Still referring to FIG. 1, the system further comprises a vehicle 112 communicatively coupled to operations center 100 by way of the illustrative wireless network 110. The vehicle 112 may comprise a computer system 116 communicatively coupled to a wireless network interface 114, a monitoring module 118, a mapping module 120, and an identification module 124. The wireless network interface 114 enables the computer system 116 to communicate with operations center 100 by way of a wireless transmission through the wireless network 110. The monitoring module 118 may assist the computer system 116 and/or the operations center 100 in collecting data related to the driving behavior of the driver. Mapping module 120 may assist the computer system 116 in performing a mapping function associated with the location of the vehicle 112. Identification module 124 may assist the computer system 112 and/or the operations center 100 in collecting data related to identifying which driver is operating the vehicle 112. Various techniques for monitoring the vehicle, as well as identifying the driver, will be discussed more thoroughly below.

In accordance with at least some embodiments, the operations center 100 may have the ability to send an alert 132 related to driving behavior to an administrative agent 106, a vehicle owner or driver 128, and/or a third party external agent 130. The alert related to driving behavior may be transmitted using any suitable communications system, including electronic mail, short messaging service (SMS), instant messaging, automated telephone calls, and the like. Likewise, the vehicle 112, in some embodiments, may have the ability to directly send the alert 132, by way of wireless network 110, to the administrative agent, vehicle owner or driver, and/or a third party external agent. However, in other cases, the alert 132 may be sent from the vehicle 112 by way of wireless network 110 to the operations center 100 before being sent to the administrative agent, the vehicle owner or driver, and/or the third party external agent.

The specification now turns to a high level description of detecting driving behaviors. In particular, driving behaviors may be detected, at least in part, by a device or devices in the monitoring module 118 coupled to the computer system 116. That is, either data gathered by the computer system 116 by way of the monitoring module 118 may determine driving behaviors, or data gathered by the monitoring module 118 and communicated by way of a wireless transmission to the operations center 100 may determine the driving behaviors of a driver operating vehicle 112. Various example embodiments of determining driving behaviors will be discussed more thoroughly below.

Figure 2:
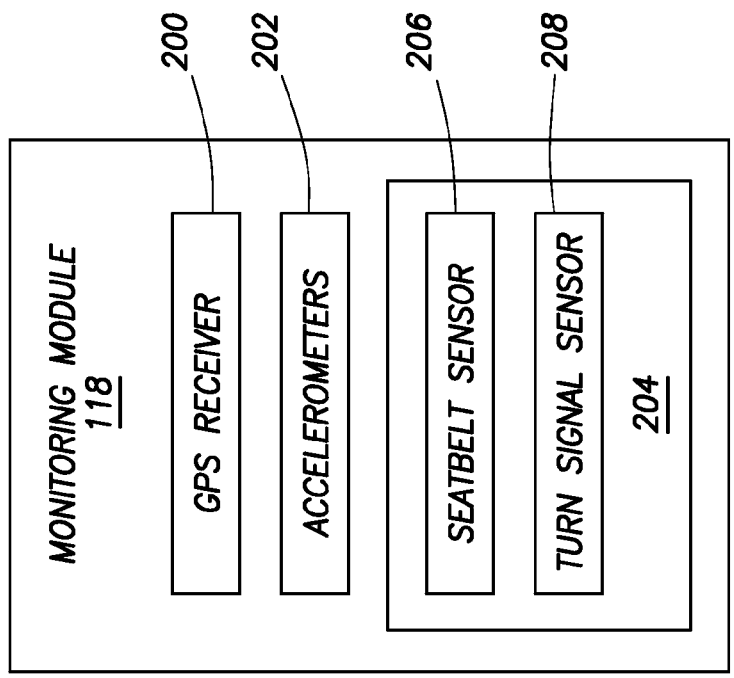
FIG. 2 shows, in block diagram form, a monitoring module in accordance with at least some embodiments.

Turning now to FIG. 2, FIG. 2 shows, in block diagram form, monitoring module 118 in greater detail. In particular, in accordance with at least some embodiments, the monitoring module 118 may comprise a Global Positioning System (GPS) receiver 200. The GPS comprises a plurality of satellites broadcasting very precise timing signals. The GPS receiver 200, receiving a plurality of the timing signals, may determine not only the location of the GPS receiver 200 (and thus the vehicle 112), but may also establish navigation information, such as speed and direction of travel. In accordance with at least some embodiments, the navigation information derived from the GPS receiver 200 can be used to determine at least some driving behaviors. For example, in some embodiments, the monitoring module 118 may detect that the driver is exceeding speed limits by monitoring the speed of the vehicle 112 as received by the GPS receiver 200. In another embodiment, location information received by GPS receiver 200 may aid in detecting whether the driver slams on his brakes by recognizing a sudden deceleration over a short period of time (e.g., coming to a complete stop from 60 miles per hours in one second or less). Slamming on the brakes may be indicative of coming to an unexpected stop when speeding, when tailgating, or when not paying attention to other drivers. In yet another embodiment, the vehicle may experience one or more sudden changes of direction in the plane of travel (i.e., the plane on which the car rests. In one embodiment, if the vehicle is driving on a flat, non-sloped road, the plane of travel is the plane of the road itself) which may indicate a vehicle swerving in and out of traffic, or making quick, sudden lane changes.

In some cases, the computer system 116 communicating with GPS receiver 200 may make the determination that vehicle 112 is driving in a way that a real-time alert should be issued to an administrative agent, the vehicle owner or driver, or a third party. In other cases, however, the computer system 116 may read the data from the GPS receiver 200, and send the navigation data to the operations center 100 by the wireless network 110. In another embodiment, an indication of driving behavior may be stored in memory of computer system 116. In another embodiment, the indication of driving behavior may be sent from vehicle 112 over wireless network 110 to the operations center 100 and then stored for later access or transmission.

Still referring to FIG. 2, in addition to, or in place of, the GPS receiver 200, in accordance with at least some embodiments, the monitoring module 118 may comprise one or more accelerometers 202 communicatively coupled to the computer system 116. In some embodiments, a single accelerometer may be sufficient for determining the vehicle has applied the brakes, engaged the accelerator pedal, has changed lanes, and with what force and speed each action has occurred. In other embodiments, the accelerometer 202 may comprise a three-axis accelerometer, such that acceleration in all three dimensions can be determined. While a three-axis accelerometer 202 cannot determine absolute position, data read from a three axis-accelerometer may be helpful in determining driving behaviors. Consider, for example, the situation of a driver slamming on his brakes to avoid hitting a car that has stopped in front of him. In some embodiments using an accelerometer, the deceleration rate of a vehicle exceeding some predetermined value may be indicative of the driver slamming on his brakes to avoid a collision or to avoid running a red light. Similarly, if the driver swerves to avoid a collision, or to change lanes swiftly, as may occur when a driver is weaving in and out of traffic, the three-axis accelerometer may be able to determine a rate of change of direction in the z-plane exceeding a predetermined value within a predetermined time. While at some levels the determination discussed with respect to the accelerometers are somewhat duplicative of the determinations that may be made using the GPS receiver 200, determinations using the accelerometers 202 may be made more quickly than the same determinations made using GPS receivers 200, and may also provide a different overall picture of a driver's driving habits.

Still referring to FIG. 2, monitoring module 118 may also comprise vehicle sensors 204. In one embodiment, vehicle sensor 204 may comprise a seat belt sensor 206 coupled to the computer system 116. The computer system 116 or the operations center 100 may collect data regarding whether or not the seat belts have been fastened. In another embodiment, vehicle sensors 204 may comprise a turn signal sensor 208 coupled to the computer system. The turn signal sensor, in addition to the GPS receiver and/or accelerometers, may indicate whether a driver is using turn signals before turning or changing lanes.

Although not specifically shown in FIG. 2, monitoring module 118 may also comprise a plurality of other information and data gathering tools and devices. For example, in one embodiment, the monitoring module 118 may communicate with a lane departure warning system coupled to the onboard vehicle computer in order to receive data on whether the vehicle is drifting out of the lane in which it is currently traveling. In another embodiment, the monitoring module 118 may comprise technology to monitor changes in head and eye movement which may indicate whether the driver is or is not fully alert. In particular, changes in head and eye movement may be used to determine whether the driver is falling asleep at the wheel, is operating the radio or navigation system, or is using a mobile device for phone calls, internet use, or text messaging. In yet another embodiment, monitoring module 118 may utilize technology coupled to the onboard vehicle computer which monitors the distance between neighboring vehicles to determine whether the driver of the vehicle is tailgating or is otherwise driving at an unsafe distance from other vehicles. The monitoring module 118 is not limited to the technologies shown in FIG. 2 or to the additional technologies described herein, but may include any technologies and devices which may provide information and data related to the operation of the vehicle. The specification now turns to a high level description of identifying which driver is operating the vehicle for which data will be collected.

Figure 3:
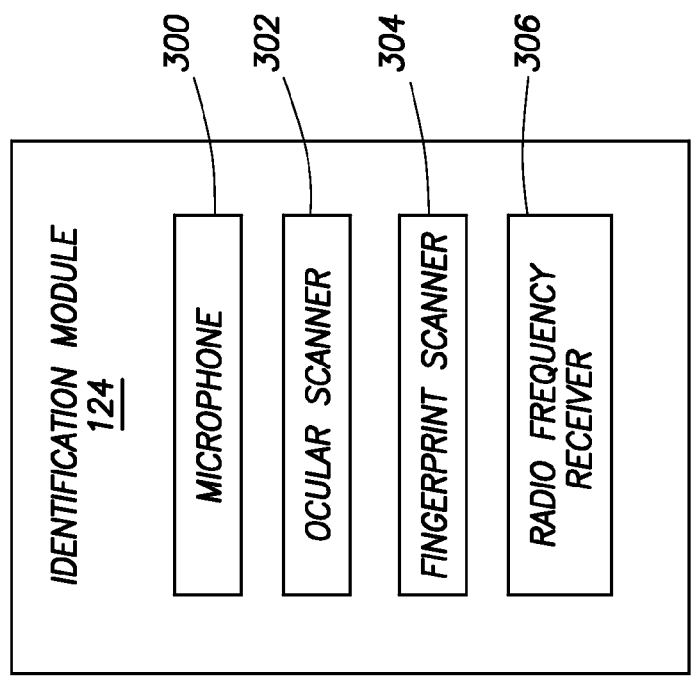
FIG. 3 shows, in block diagram form, an identification module in accordance with at least some embodiments.

Turning now to FIG. 3, FIG. 3 shows, in block diagram form, an identification module 124. Identification module 124 is coupled to computer system 116 and wireless network interface 114, and may comprise a plurality of identification systems used to identify which driver is operating the vehicle. In particular, one vehicle may be driven by any number of drivers. For example, a family of four may have one vehicle which is driven by each of the four family members. In order to correctly assign an indication of driving behavior to the correct driver, the identification module 124 identifies which driver is operating the vehicle. The method of identifying a specific driver will be discussed more thoroughly below.

In one embodiment, identification module 124 may comprise a radio frequency (RF) receiver 306. The RF receiver 306 may establish which driver is operating the vehicle by way of receiving an RF signal from a key fob assigned to the driver. A driver may be assigned a unique key fob which allows him to, among other possibilities, unlock the vehicle, configure the interior to his preset preferences, and identify him as the driver for whom operation of the vehicle will be monitored.

In yet another embodiment, identification module 124 may comprise a fingerprint scanner 304 operatively coupled to the computer system 116. The fingerprint scanner may establish which driver is operating the vehicle by way of receiving a scan of the driver's fingerprint. The scanned fingerprint is matched to fingerprint images stored in memory, and the driver is identified. In yet still another embodiment, identification module 124 may comprise a microphone 300 operatively coupled to the computer system 116. The microphone 300 may help establish which driver is operating the vehicle by way of voice recognition. In particular, the microphone receives audio signals representing the driver's voice and subsequently matches the signals to voice files stored in a computer system, such as within computer system 116 or processor 102. The driver is then identified and associated with the subsequent vehicle operation.

In yet still another embodiment, identification module 124 may comprise an ocular scanner 302 operatively coupled to the computer system 116. The ocular scanner 302 may help establish which driver is operating the vehicle by way of scanning the driver's eye. In one embodiment, the ocular scanner 302 may be an iris scanner, and in another embodiment, the ocular scanner 302 may be a retinal scanner, however the scanning is not limited to only iris and retinal scans. A driver may have his eye scanned, and then eye scan is then matched to ocular maps stored in memory, and the driver is associated with the subsequent vehicle operation.

In yet still another embodiment, the driver may be identified by way of the wireless network 110 receiving a signal from the driver's mobile device located within the vehicle. In particular, the wireless network 110 may communicate with the driver's mobile device (e.g., such as through Bluetooth communications), to determine the mobile device is located within the vehicle, and thus associates the presence of the mobile device with the driver operating the vehicle.

While the above discussion provides a variety of ways in which the driver may be identified and subsequently linked to the operation of the vehicle, the ways in which the driver may be identified are not limited to the above examples.

The specification now turns to issuing an alert related to the driving behavior of the driver. Once a driver has been identified, the system begins collecting data related to the driving behavior of the driver. As discussed previously, a plurality of driving behavior data may be collected including, but not limited to, the speed of travel; braking force applied; z-plane movement; seat belt usage; and turn signal usage. In addition, in one embodiment, the location of the vehicle may be monitored to determine whether the driver is driving the vehicle in locations that are considered safe or dangerous (e.g., a neighborhood with a low or high crime rate). In another embodiment, the location of the vehicle in real-time combined with a weather report and an indication of driving behavior may indicate whether or not the driver has driving behaviors that vary based on the weather (e.g., driving slower in rain).

Figure 4B:
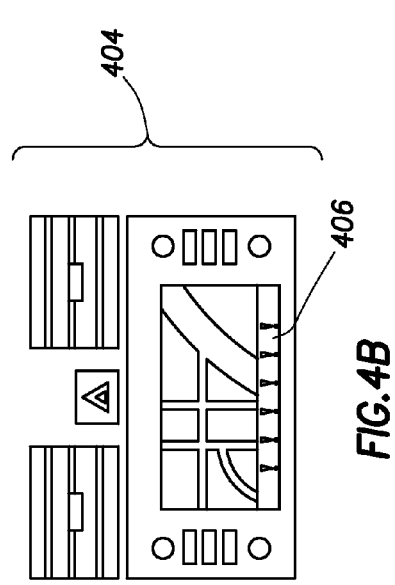
FIG. 4B shows example alert notifications in accordance with at least some embodiments.
Figure 4D:
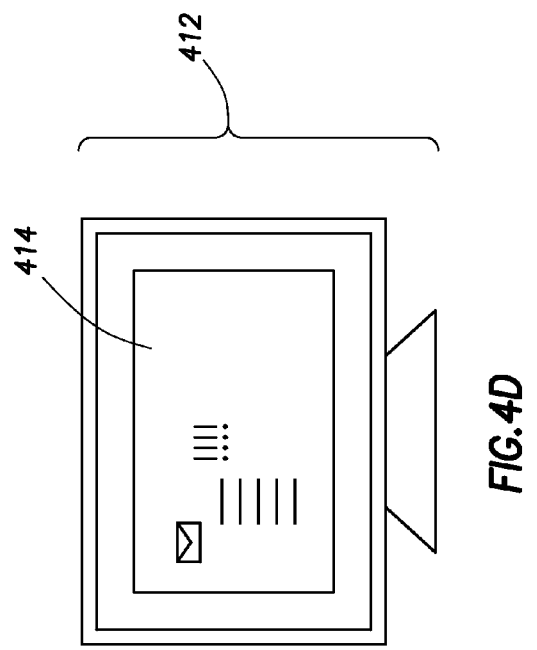
FIG. 4D shows example alert notifications in accordance with at least some embodiments.
Figure 4A:
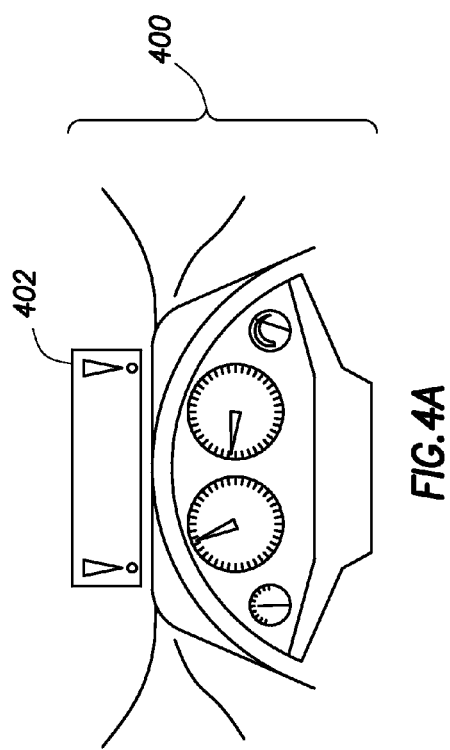
FIG. 4A shows example alert notifications in accordance with at least some embodiments.
Figure 4C:
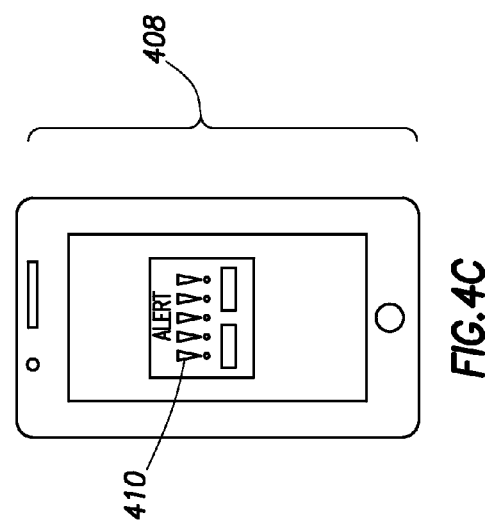
FIG. 4C shows example alert notifications in accordance with at least some embodiments.

As data is collected, an alert may be received related to the driver's driving behavior. Turning now to FIGS. 4A-D, there may be a plurality of ways in which a driver may receive an alert. In particular, FIG. 4A shows the driver's view 400 from behind the wheel of the vehicle. When the driver drives in such a way that an alert may be issued, a head-up-display 402 on the windshield may display an alert containing the relevant alert information. In another embodiment, such as in FIG. 4B, the driver may receive the alert on a navigation computer system 406 coupled to the dashboard 404 of the vehicle. In yet another embodiment, such as in FIG. 4C, the driver may receive the alert 410 on a handheld wireless device 408 (e.g., a smartphone). In yet still another embodiment, FIG. 4D shows an example in which the driver may receive an alert 414 in the form of an electronic mail message; a pop-up alert; or an instant message on a display device 412, such as a laptop monitor or desktop monitor.

Issue alerts are not limited to being received by a driver. In another embodiment, a third party may receive an alert related to the driving behavior of the driver. For example, a parent may receive alerts related to the driving behavior of a child. In another embodiment, an insurance company may receive alerts related to the driving behavior of an insured driver.

Alerts may be issued in real-time as driver drives in such a way to warrant an alert. For example, if the driver exceeds the speed limit, an excessive speed alert may be issued. In another embodiment, however, data related to driving behavior may be stored, or aggregated and stored, for issuing an alert at a later time. As discussed previously, data related to driving behavior may be stored within computer system 116, or at a remote computer system. Regardless of where the indication of driving behavior may be stored, an alert may be issued that indicates an aggregate of driving behavior at the end of a selected time period. In one embodiment, the system may collect data related to driving behavior for each time period between the ignition being turned on and it being turned off (i.e., each car trip). In another embodiment, the system may collect data and report it by way of an alert at the end of an hour long period. In yet another embodiment, the system may collect data and report it by way of an alert at the end of a day period, or month.

Alerts related to driving behavior may be used as driving behavior feedback. If the alerts are issued to the driver, either in real time or at a later time period, the driver may be able to utilize driving behavior data to improve the efficiency and/or safety of operating the vehicle. For example, if a driver is receiving an alert indicative of an aggregation of data over the period of a week, the driver may notice a pattern of excessive speeds, or a tendency to make panic stops. Knowledge of these behaviors may result in the driver slowing down or being more aware of vehicles nearby that have come to a stop.

In another embodiments, alerts being issued to a third party may provide an indication of the type of driving in which the driver engages. In one embodiment, feedback related to the driver's driving behavior may be provided to an insurance company, which may affect the driver's insurance policy. For example, if the insurance company rarely receives alerts related to safe driving, the insurance company may lower the driver's premium or deductible. On the other hand, if the insurance company receives alerts indicating unsafe driving, the insurance company may increase the costs of being insured. In another embodiment, alerts may be issued to a financing company. For example, alerts indicating safe driving may lower the interest rate the driver is paying on a car loan. Regardless to whom the alerts are being issued, or whether they are being issued in real time, or after a set period of time, a driver or a third party may consider the alerts as feedback related to the driver's driving behavior.

Figure 5:
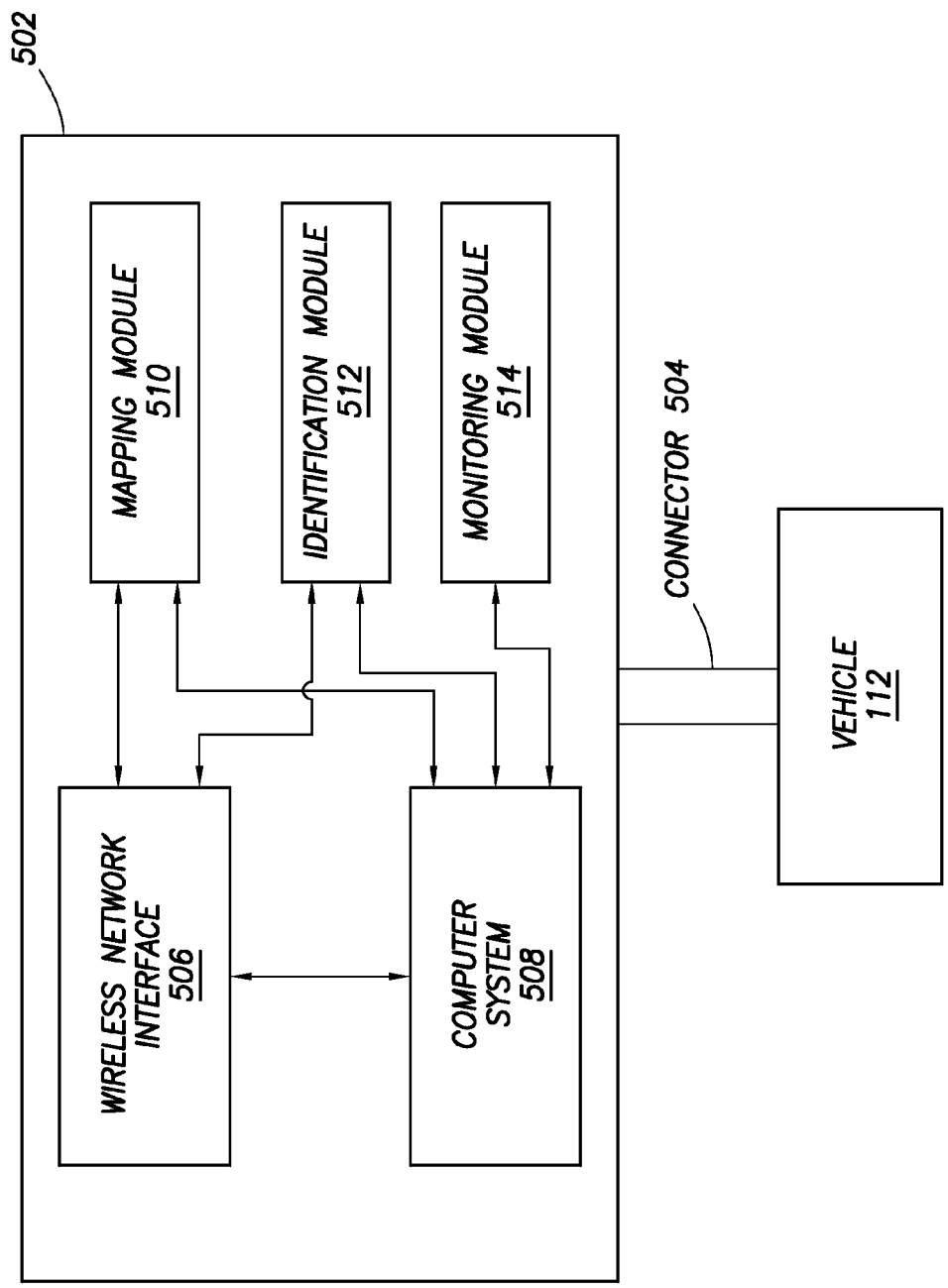
FIG. 5 shows, in block diagram form, an after-market system connected to a vehicle in accordance with at least some embodiments.

Referring now to FIG. 5, in some embodiments, the wireless network interface 114, computer system 116, monitoring module 118, mapping module 120 and identification module 124 may be part of the vehicle 112 as purchased from the manufacturer or dealer. In other embodiments, however, the wireless network interface, computer system, monitoring module, mapping module, and identification module may be part of a third-party after-market system 502. In particular, FIG. 5 shows, in block diagram form, after-market system 502 coupled to vehicle 112 by way of an electrical connector 504, and comprises wireless network interface 506; computer system 508, mapping module 510, identification module 512, and monitoring module 514. In some embodiments, the after-market system 502 may be mechanically coupled to the inside of a vehicle 112, such as within the dashboard. In other embodiments, the after-market system 502 may be coupled at any suitable location, such as within the engine compartment, or in the trunk.

The method of determining an indication of driving behavior and issuing an alter related to driving behaviors will be discussed in more detail. FIG. 6 shows a flow diagram depicting an overall method of issuing an alert related to the driving behavior of a driver: The method starts (block 600), then moves to determining an indication of driving behavior of a driver (block 602), the determining by: identifying the driver in a vehicle (block 604); detecting movement of the vehicle (block 606); collecting data related to the driving behavior of the driver (block 608); and issuing an alert related to the driving behavior of the driver for the purpose of providing feedback related to driving behavior (block 610). Thereafter, the method ends (block 612).

FIG. 7 shows a computer system 700 which is illustrative of a computer system upon which the various embodiments may be practiced. The computer system 700 may be illustrative of, for example, computer system 116 coupled to the vehicle 112. In another embodiment, computer system 700 may be illustrative of processor 102. In yet another embodiment, the computer system could be illustrative of computer system 508 coupled to third-party after-market system 502. The computer system 700 comprises a processor 702, and the processor couples to a main memory 704 and a storage device 708 by way of a bridge device 706. Programs executable by the processor 702 may be stored on the storage device 708 (e.g., a hard drive, solid state disk, memory stick, optical disc), and accessed when needed by the processor 702. The program stored on the storage device 708 may comprise programs to implement the various embodiments of the present specification, such as determining driving habits of a driver. In some cases, the programs are copied from the storage device 708 to the main memory 704, and the programs are executed from the main memory 704. Thus, both the main memory 704 and storage device 708 shall be considered computer-readable storage mediums.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiment," "various embodiments," or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of issuing alerts related to driving behaviors, this context shall not be read as a limitation as to the scope of one or more of the embodiments described—the same techniques may be used for other embodiments. It is intended that the following claims be interpreted to embrace all such variations and modifications.

The invention claimed is:

1. A method comprising:
communicating, by way of a wireless cellular network, between an identification module coupled within a vehicle and an operations center remote from the vehicle;
determining an indication of driving behavior of a driver in the vehicle, the determining by:
detecting, by the identification module, a wireless cellular signal transmitted from a mobile device associated with the driver wherein the mobile device is different from the identification module;
identifying the driver in the vehicle by way of the detected wireless cellular signal;
collecting data, by a monitoring module coupled to the vehicle, related to the driving behavior of the driver;
issuing an alert to a third party, the alert providing the indication of driving behavior of the driver, wherein an interest rate of a vehicle loan currently issued to the driver is adjusted based on the alert.

2. The method of claim 1 further comprising displaying the alert to the driver.

3. The method of claim 2 wherein displaying the alert further comprises displaying the alert by way of at least one selected from the group consisting of: an alert sent to a smartphone application; a visual alert sent to a navigation system coupled to the vehicle; and an alert sent to a heads-up display (HUD) coupled to the vehicle.

4. The method of claim 1 wherein collecting data further comprises collecting at least one selected from the group consisting of: location of the vehicle; speed of the vehicle; acceleration of the vehicle; deceleration of the vehicle; turn signal usage of the vehicle; and seat belt usage of the vehicle.

5. The method of claim 1 further comprising:
receiving, by a Global Positioning Receiver, Global Positioning System signals;
creating, by the Global Positioning Receiver, location information based on the Global Positioning System signals; and
monitoring the movement of the vehicle based, at least in part, on the location information.

6. The method of claim 1 further comprising:
monitoring the movement of the vehicle based on movement detected by a three-axis accelerometer associated with the vehicle.

7. A method comprising:
communicating, by way of a wireless cellular network, between an identification module coupled within a vehicle and an operations center remote from the vehicle;
determining an indication of driving behavior of a driver, the determining by:
identifying, by the identification module, the driver in a vehicle by way of a wireless cellular signal transmitted from a mobile device associated with the driver;
detecting movement of the vehicle;
collecting data related to the driving behavior of the driver; and
issuing an alert comprising the indication of driving behavior of the driver,
wherein an interest rate of a vehicle loan currently issued to the driver is adjusted based on the alert.

8. A system comprising:
an onboard device comprising:
a processor;
a global positioning system receiver coupled to the processor;
a wireless interface coupled to the processor;
a memory coupled to the processor, the memory storing a program that, when executed by the processor, causes the processor to:
identify a driver in a vehicle by way of a wireless cellular signal transmitted from a mobile device associated with the driver, wherein the mobile device is different from the onboard device;
detect a movement of the vehicle;
collect data related to the driving behavior of the driver; and
issue an alert related to the driving behavior of the driver, wherein an interest rate of a vehicle loan currently issued to the driver is adjusted based on the alert.

9. The system of claim 8 wherein when the processor issues the alert, the program further causes the processor to issue the alert to the driver.

10. The system of claim 8 wherein when the processor issues the alert, the program further causes the processor to issue the alert to a third party.

11. The system of claim 8 wherein when the processor collects, the program further causes the processor to collect data related to at least one selected from the group comprising: location of the vehicle; speed of the vehicle; acceleration of the vehicle; deceleration of the vehicle; turn signal usage of the vehicle; and seat belt usage of the vehicle.

12. The method of claim 8 wherein when the processor detects, the program further causes the processor to detect based on Global Positioning System signals received.

13. The method of claim 8 further comprising:
a three-axis accelerometer coupled to the processor;
wherein when the processor detects, the program further causes the processor to detect based on movement detected by the three-axis accelerometer.

14. The method of claim 1 further comprising:
receiving information from an individual, corresponding to configuring a set of boundaries, the configuration related to determining the indication of driving behavior and relating to issuing the alert.

15. The method of claim 7 further comprising:
receiving information from an individual, corresponding to configuring a set of boundaries, the configuration related to determining the indication of driving behavior and relating to issuing the alert.

16. The system of claim 8 wherein when the processor collects data, the data is collected based on a configuration determined by the driver.

17. The method of claim 1 wherein issuing the alert to the third party further comprises issuing the alert to a financing company in real-time as the driver drives.

18. A system comprising:
a processor;
a wireless interface coupled to the processor;
a memory coupled to the processor, the memory storing a program that, when executed by the processor, causes the processor to:
receive an identity of a driver from an onboard device coupled to a vehicle;
receive data collected by the onboard device coupled to the vehicle, the data related to the driving behavior of the driver; and issue an alert to a third party that causes an adjustment to an interest rate of a vehicle loan currently issued to the driver, wherein the alert is based on the data collected related to the driving behavior of the driver.

19. The method of claim 1 wherein a frequency of alerts issued determines at least one selected from the group consisting of: an interest rate; a loan premium; and a deductible amount.

20. The method of claim 1, wherein the operations center is remotely located from the vehicle.

21. The method of claim 1, wherein collecting data related to the driving behavior of the driver comprises collecting data related to at least one selected from the group comprising: location of the vehicle; speed of the vehicle; acceleration of the vehicle; deceleration of the vehicle; turn signal usage of the vehicle; and seat belt usage of the vehicle.

22. The method of claim 18, wherein receive data collected by the onboard device further comprises data received in real-time as the driver drives.

\* \* \* \* \*